Feb. 9, 1960
G. S. ELLIS
2,924,237
FLOW CONTROL VALVE
Filed June 24, 1955
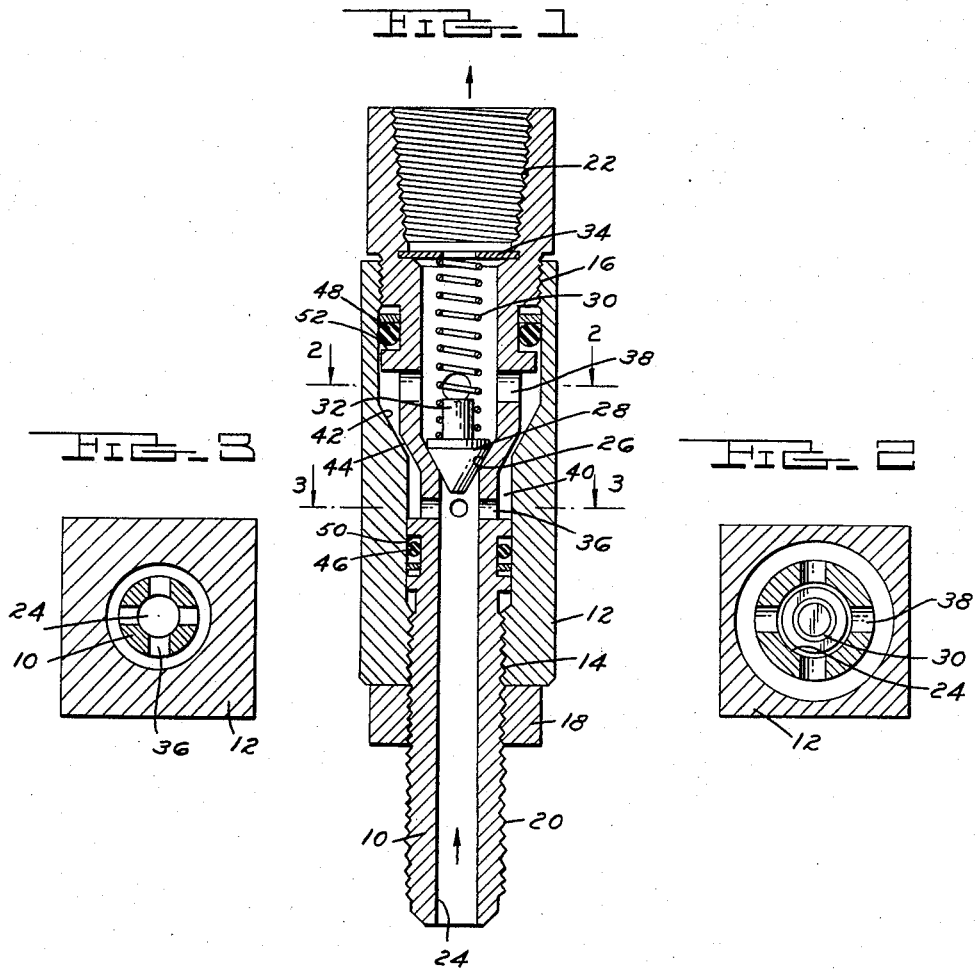
INVENTOR.
GEORGE S. ELLIS
BY
Burton E. Parker
ATTORNEYS

United States Patent Office 2,924,237
Patented Feb. 9, 1960

2,924,237

FLOW CONTROL VALVE

George S. Ellis, Fraser, Mich., assignor, by mesne assignments, to L & L Manufacturing Company, East Detroit, Mich., a corporation of Michigan Application June 24, 1955, Serial No. 517,677

1 Claim. (Cl. 137—599.2)

This invention relates to fluid flow control valves and particularly to a valve permitting full flow in one direction and adjustable determined flow in the opposite direction.

Heretofore, in valves permitting free flow in one direction, and adjustable determined or restricted flow in the opposite direction, the free flow has been subject to a tortuous route through the valve with resulting turbulence that disturbed a more ideal free flow characteristic such as is found in the conventional in-line check valve. Therefore, an object of my invention is the provision of a valve the free flow characteristic of which is substantially the same as a conventional in-line check valve and which also may be readily adjusted to either completely check the return flow or permit selection of a wide range of restricted return flow.

Another object of my invention is the provision of a valve of the character mentioned in which the free flow and return flow passages are concentrically arranged to provide a generally in-line structure.

Another object of the invention is the provision of a valve of the character mentioned which includes a body member defining a passageway therethrough within which is a check valve, with a pair of ports opening through the wall of the passageway on the upstream and downstream sides of the valve, and a sleeve shiftably encircling the body member and defining therewith a fluid passageway communicating with each of said ports and providing a bypass around the check valve which is variable in flow capacity according to the relative shifted positions of the sleeve and body members.

Other objects, advantages, and meritorious features will more fully appear from the specification, claims, and accompanying drawing, wherein:

Fig. 1 is a cross sectional view taken through a flow control valve embodying my invention;

Fig. 2 is a cross sectional view taken on the line 2—2 of Fig. 1; and

Fig. 3 is a cross sectional view taken on the line 3—3 of Fig. 1.

As shown in Fig. 1 a flow control valve embodying my invention includes two threadedly connected members, a generally elongate cylindrical body member 10, and a generally elongate sleeve member 12 shiftably received over the body member and threadedly connected thereto at 14 and 16. The exterior of the sleeve may be suitably shaped, such as shown in Figs. 2 and 3, to receive the jaws of a wrench to permit threaded rotation of the sleeve upon the body member. A lock nut 18 engaging threads 20 is adapted to lock the sleeve and body members in determined adjusted positions. The male threads 20 and the female threads 22 are adapted to couple the body member to fluid pressure lines.

The body member 10 is provided therethrough with a passageway 24. Within the passageway is disposed a spring loaded check valve. The check valve includes an annular valve seat 26, and a valve element 28 adapted to be held against the valve seat by a coil spring 30 bearing at one end against the valve element 28 and encircling the boss 32 thereof, and bearing at its opposite end against an apertured spring retainer 34 received within a provided groove in the body member. Fluid flow through passageway 24 in the direction of the arrows is adapted to lift the check valve element 28 and permit free and full flow through the passageway. Flow through passageway 24 in a direction opposite to the arrows is adapted to be checked by valve element 28 seating against the valve seat 26, to be held thereagainst by the action of the pressure of the fluid and the tension of coil spring 30.

A plurality of ports open through the wall of passageway 24 on the upstream and downstream sides of the check valve. The ports on the upstream side of the check valve are indicated at 36, while the ports on the downstream side of the valve are indicated at 38. Fluid flowing through passageway 24 may enter ports 36 and 38 and flow therethrough for a purpose hereinafter described.

Sleeve member 12 is adapted to cooperate with body member 10 to define therewith and therebetween an annular passageway 40, concentric with passageway 24, and communicating therewith through ports 36 and 38, to provide a bypass around the check valve. Sleeve 12 is provided with an annular shoulder 42, and the body member 10 is provided with an annular shoulder 44 complementing shoulder 42. Shoulders 42 and 44 serve as cooperating valve elements. Passageway 40 extends between complementary shoulders 42 and 44, and the flow through passageway 40 is adapted to be adjustably restricted by the adjusted relative proximity of the shoulders to each other. By threading sleeve 12 downwardly on the body member, as viewed in Fig. 1, the shoulders are moved apart and permit a greater flow capacity through passageway 40 than if the sleeve is threaded in the opposite direction upon the body. From a consideration of Fig. 1 it is apparent that sleeve 12 may be threaded upwardly on the body until complementary shoulders 42 and 44 are in abutment with one another and in this case flow through passageway 40 is completely checked. By adjustment of relative positions of sleeve 12 upon body 10, a wide variety of restricted flow through passageway 40 may be obtained.

Disposed between body member 10 and sleeve 12 at opposite ends of passageway 40, and received within provided annular grooves in the body member, are O-ring gaskets 46 and 48. The grooves 50 and 52 within which the O-rings are received are of a greater length than the cross-sectional diameter of the O-rings to provide for a rolling action of the O-rings during threaded adjustment between the body member and the sleeve. The O-rings serve to seal the escape of fluid from between the sleeve and body members.

Upon fluid flow through passageway 24 in the direction of the arrows, check valve element 28 is lifted off its seat 26 to permit free flow through passageway 24. In addition, a certain amount of fluid will pass through ports 36, through passageway 40, and thence through ports 38 and continue on out of the body member through passageway 24. Upon reversal of flow, valve element 28 will immediately seat against valve seat 26, preventing any free return flow through passageway 24. Fluid will pass outwardly through ports 48, through passageway 40, and thence into passageway 24 through ports 36. The amount of return flow discharging from the lower end of passageway 24 may be determined by adjusting the relative positions of the sleeve and body members. It is apparent that during the free flow movement through passageway 24 in the direction of the arrows, the flow is of substantially the same character as that of a conventional in-line check valve, while at the same time provision is made for a determined amount of return flow through the device.

What I claim is:

A flow control device of the character described comprising: a generally cylindrical body member provided with a longitudinally extending passageway therethrough and having means at opposite longitudinal ends thereof for coupling attachment to a fluid system, an internal annular valve seat located in the passageway, a valve element adapted for sealing engagement with said valve seat, a coil spring, means extending from said body member transversely of said passageway and anchoring one end of said coil spring to said body member, said coil spring extending longitudinally into engagement with said valve element to bias said element into sealing engagement with said valve seat, an encircling tapering surface on the exterior of said body member intermediate opposite ends thereof, said body member having a port extending substantially transversely through its wall at two positions, one being downstream and the other being upstream of said annular valve seat and said tapering surface, a sleeve member housing the intermediate portion of said body member, said sleeve member having an internal tapering shoulder opposed to and movable into sealing engagement with said tapering surface, said sleeve member and body member having mating threads for adjustably positioning the sleeve member on the body member to regulate the by-pass opening between and to sealably engage said tapering shoulder and tapering surface, said sleeve member having an internal annular wall upstream and downstream of its tapering shoulder which forms with the adjacent body member generally annular passageways concentric with the body member passageway and communicating through said ports and said by-pass opening between said tapering shoulder and surface with the upstream and downstream sides of said check valve to allow regulated flow therethrough in accordance with the setting of the sleeve member on the body member.

References Cited in the file of this patent

UNITED STATES PATENTS

| | | |
|---|---|---|
| 433,543 | Schreidt | Aug. 5, 1890 |
| 486,722 | Loss | Nov. 22, 1892 |
| 1,340,107 | Blache | May 11, 1920 |
| 1,405,192 | Eustis | Jan. 31, 1922 |
| 2,397,472 | Crowell | Apr. 2, 1946 |
| 2,690,807 | Moosman | Oct. 5, 1954 |